US012712866B2

(12) United States Patent
Fraser Brown et al.

(10) Patent No.: US 12,712,866 B2
(45) Date of Patent: Aug. 18, 2026

(54) APPARATUS AND METHOD FOR MANAGING CREDENTIALS

(71) Applicant: Cubist, Inc., Palo Alto, CA (US)

(72) Inventors: Madeleine Lucy Fraser Brown, Pittsburgh, PA (US); Aleksandar Milicevic, San Diego, CA (US); Andres Philipp Noetzli, Palo Alto, CA (US); John Michael Renner, Arlington, VA (US); Deian Stefan, San Diego, CA (US); Riad Samir Wahby, Pittsburgh, PA (US)

(73) Assignee: Cubist, Inc., Palo Alto, CA (US)

( * ) Notice: Subject to any disclaimer, the term of this patent is extended or adjusted under 35 U.S.C. 154(b) by 38 days.

(21) Appl. No.: 18/634,718

(22) Filed: Apr. 12, 2024

(65) Prior Publication Data

US 2024/0348592 A1 Oct. 17, 2024

Related U.S. Application Data

(60) Provisional application No. 63/459,155, filed on Apr. 13, 2023.

(51) Int. Cl.
*H04L 9/40* (2022.01)

(52) U.S. Cl.
CPC ............ *H04L 63/08* (2013.01); *H04L 63/101* (2013.01)

(58) Field of Classification Search
CPC .............................. H04L 63/101; H04L 63/08
See application file for complete search history.

(56) References Cited

U.S. PATENT DOCUMENTS

| | | | | |
|---|---|---|---|---|
| 2014/0006498 | A1 | 1/2014 | Liu et al. | |
| 2020/0351657 | A1* | 11/2020 | Wentz | H04L 9/3231 |
| 2021/0097528 | A1* | 4/2021 | Wang | H04L 9/30 |
| 2023/0040468 | A1 | 2/2023 | Buendgen et al. | |
| 2023/0325814 | A1* | 10/2023 | Vijayan | G06Q 20/3829 705/66 |

FOREIGN PATENT DOCUMENTS

| | | | |
|---|---|---|---|
| CN | 111489157 | A | 8/2020 |
| WO | WO-2020141780 | A1 | 7/2020 |

OTHER PUBLICATIONS

PCT/US2024/024397 International Search Report and Written Opinion mailed Jul. 15, 2024, 11 pages.

* cited by examiner

*Primary Examiner* — Benjamin A Kaplan
(74) *Attorney, Agent, or Firm* — Goodwin Procter LLP

(57) ABSTRACT

In an aspect, an apparatus for managing credentials is presented. The apparatus includes a processor and a memory communicatively connected to the processor. The memory contains instructions configuring the processor to receive a user request. The processor is configured to authenticate the user request through an authentication module. The processor is configured to combine the authentication data with the user request to generate an authentication request. The processor is configured to communicate the authentication request to an authorization module. The processor is configured to authorize the user request at the authorization module based on the authentication data. The processor is configured to sign the user request to generate a user signature, wherein the user signature provides a user with access to an immutable sequential listing.

20 Claims, 7 Drawing Sheets

APPARATUS AND METHOD FOR MANAGING CREDENTIALS

CROSS-REFERENCE TO RELATED APPLICATION

This application claims priority to and the benefit of U.S. Provisional App. No. 63/459,155, filed Apr. 13, 2023, the entirety of which is incorporated herein.

TECHNICAL FIELD

The subject matter of this application relates generally to user credentials. In particular, the present application is related to an apparatus and method for managing credentials.

BACKGROUND

Interactions with blockchains tend to require authentication, such as public/private key pairs. However, modern systems for managing keys are tedious and cumbersome. An apparatus and method for managing credentials is disclosed.

SUMMARY

In an aspect, an apparatus for managing credentials is presented. The apparatus includes a processor and a memory communicatively connected to the processor. The memory contains instructions configuring the processor to receive a user request and authenticate the user request through an authentication module. The authentication data is combined with the user request to generate an authentication request. The authentication request is communicated to an authorization module. The user request is authorized at the authorization module based on the authentication data. The user request is used to produce a signature. The user signature provides a user with access to an immutable sequential listing.

DETAILED DESCRIPTION

At a high level, aspects of the present disclosure may be used to manage one or more cryptographic keys. Aspects of the present disclosure may be used to generate, export, import, and duplicate one or more cryptographic keys. In an aspect, the present disclosure may be used to provide a proxy server that may communicate between on-chain and off-chain nodes.

Figure 1:
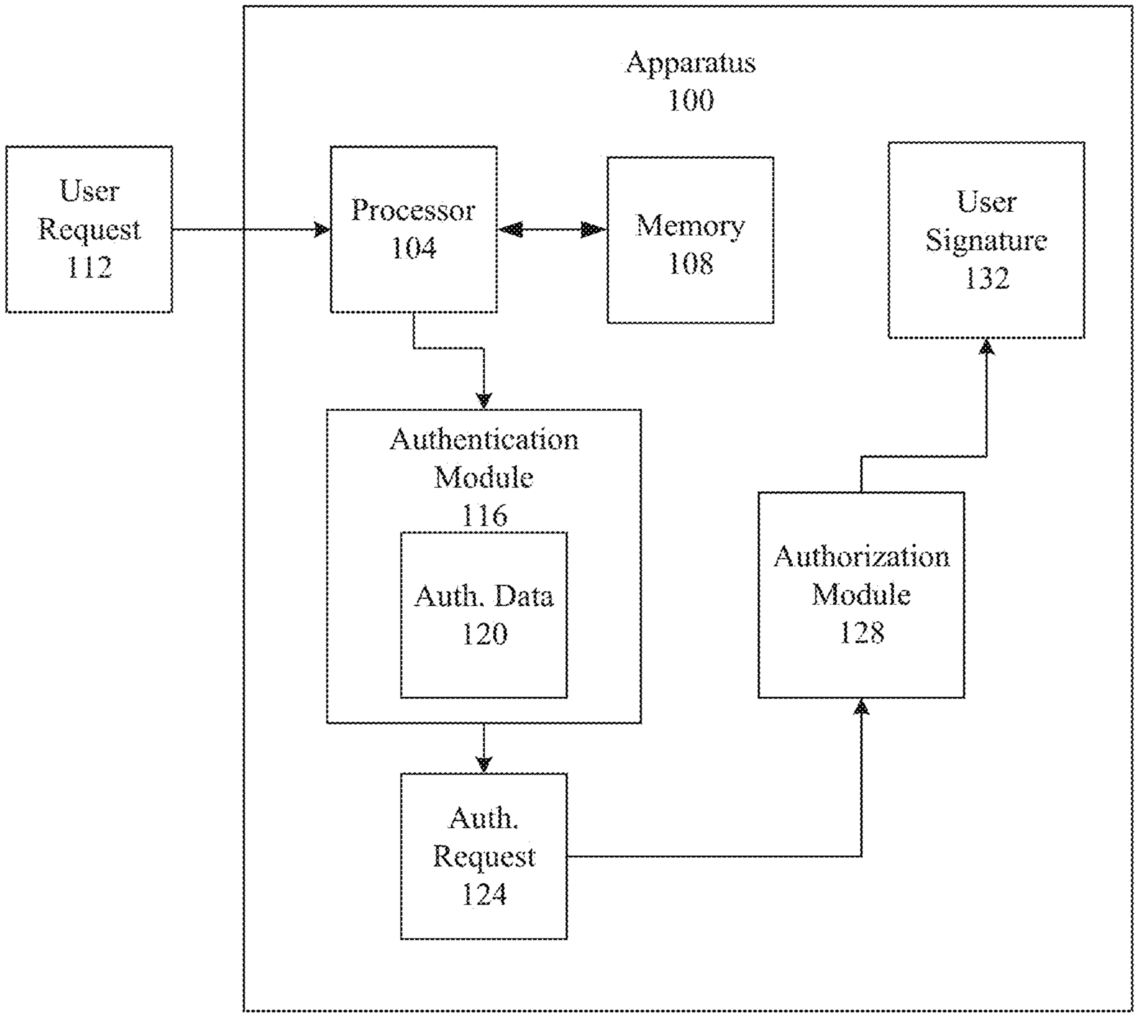
FIG. 1 illustrates a block diagram of an apparatus for managing credentials.

Referring now to FIG. 1, an apparatus 100 for managing credentials is illustrated. Apparatus 100 may include processor 104 and/or memory 108. Apparatus 100 may be configured to receive user request 112. A user request as used in this discourse is a digital call to a computing device. User request 112 may include, without limitation, requests for data, requests for access to one or more programs, requests for authorization, and the like. In some embodiments, user request 112 may be received by processor 104 from one or more external computing devices, such as, but not limited to, laptops, desktops, servers, smartphones, and the like. In other embodiments, user request 112 may be received locally at processor 104 such as through one or more input devices which may include, without limitation, keyboards, mouses, touchpads, and the like. In some embodiments, processor 104 may receive a plurality of user requests 112. Each user request of a plurality of user requests 112 may originate from a user of a group of users.

Processor 104 may authenticate user request 112 through authentication module 116. A module as used in this disclosure is hardware and/or software configured to perform one or more computing tasks. Modules may include any hardware and/or software as described throughout this disclosure, without limitation. Authentication module 116 may be configured to authenticate user request 112. For instance, authentication may include, without limitation, comparing one or more user credentials of user request 112 to one or more valid credentials, such as, but not limited to, user names, passwords, IP addresses, device names, and the like. In some embodiments, authentication module 116 may be a local authentication proxy that may be configured to authenticate username and password combinations, IP address authentication, and the like. In some embodiments, authentication module 116 may include a modified web3.js that may authenticate user request 112. In some embodiments, authentication module 116 may generate and/or pull authentication data 120. For instance, authentication module 116 may generate authentication data 120 in real-time and/or may retrieve authentication data 120 from one or more storage devices, such as memory 108. Authentication data 120 may added to user request 112 as a plugin system. A plugin system as used in this disclosure is a software component that adds a feature to an existing computer program. For instance, authentication data 120 may be provided on top of one or more authentication procedures processor 104 may employ. In some embodiments, authentication data 120 may include, without limitation, one or more characters, symbols, strings, and the like. For instance, authentication data 120 may include, but is not limited to, two-factor authentication passwords, public-key authentication such as TLS client keys, SSH keys, FIDO2 keys, SSO, bearer tokens, and the like. Processor 104 may combine authentication data 120 with user request 112 to produce authorization request 124. An "authorization request" as used in this disclosure is a submission to authenticate a user. Authorization request 124 may include, but is not limited to, API keys, basic Auth, HMAC, and/or other types of requests.

With continued reference to FIG. 1, authorization request 124 may be sent to authorization module 128. Authorization module 128 may be configured to authorize authorization request 124. In some embodiments, authorization module 128 may be configured to verify authentication data 120 of authorization request 124. For instance, and without limitation, authorization module 128 may compare one or more two-factor authentication passwords, public-private key pairings, TLS client keys, SSH keys, FIDO2 keys, SSO, bearer tokens, and/or other forms of authentication. In some embodiments, authorization module 128 may be configured to check a user token, user identify, and the like of authorization request 124. In some embodiments, authorization module 128 may be configured by a user and/or administrator with custom authorization and/or policy logic. In some embodiments, authentication module 116 and/or authorization module 128 may be integrated into various interfaces, such as JSON-RPC. Authentication module 116 and/or authorization module 128 may integrated with one or more existing programs through web3.js, in some embodiments. Authentication module 116 and/or authorization module 128 may provide JSON-RPC endpoints that may automatically grab relevant RPC calls. As a non-limiting example, relevant RPC for Ethereum may be 'eth_signTransatctoin', 'eth_sendTransactoin', and 'eth_sign'.

Processor 104 may be configured to sign, such as digitally signing, authorized request 124 with a digital signature. Processor 104 may be configured to generate user signature 132 based on user request 112, authentication data 120, and/or other data. In some embodiments, processor 104 may be configured to generate user signature 132 based on authentication of user request 112 from authentication module 116 and/or authorization of authorization request 124 based on authorization module 128, without limitation. A user signature as used in this disclosure is a digital password assigned to one or more users. User signature 132 may include a private key, digital signature, and/or other data as described throughout this disclosure, without limitation. User signature 132 may allow one or more users to interact with one or more immutable sequential listings. An immutable sequential listing as used in this disclosure is a data structure that places data entries in a fixed sequential arrangement, such as a temporal sequence of entries and/or blocks thereof, where the sequential arrangement, once established, cannot be altered or reordered. Immutable sequential listings may include one or more block chains. In some embodiments, user signature 132 may allow one or more users to interact with one or more block chains. For instance, user signature 132 may allow a user to interact with data on Ethereum, Avalanche, Solana, and/or other cryptographic platforms. In some embodiments, user signature 132 may be specific to a type of immutable sequential listing, for instance, and without limitation, an immutable sequential listing on Ethereum, Avalanche, Solana, and/or other cryptographic platforms.

In some embodiments, and still referring to FIG. 1, user signature 132 may grant access to or otherwise allow one or more users to perform one or more actions. For instance, and without limitation, user signature 132 may allow one or more users to view secret key material, sign arbitrary data, sign a transaction, sign a transaction with a maximum value, send a transaction after signing the transaction, generate a new key, add a new user, add a new group, add a user to a group, assign a policy to a key, assign a policy to a group, and the like. Processor 104 may allow one or more users one or more permissions for the above actions. In some embodiments, one or more users may be restricted from the above listed or other actions.

Still referring to FIG. 1, processor 104 may be configured to generate an access control list (ACL) policy for one or more users. An ACL policy may include permissions that specify conditions required to perform certain operations on one or more resources. For instance, an ACL policy may include one or more permissions for a user, group of users, and the like. As a non-limiting example, a first user may be authenticated and granted permissions to access data while a second user may not be authenticated and may be denied permissions to access the same data. Continuing this example, a group of users, such as a group title "developers", may be authenticated and granted access to the data while a second group, such as with a group title of "front-end", may not be authenticated and may be denied access to the same data. Processor 104 may generate an ACL or other policy that may grant one or more users one or more permissions to access various data, programs, and the like. In some embodiments, processor 104 may store permissions and authentications in memory 108. In other embodiments, processor 104 may store permissions and authentications in a permissions database. A permissions database may include data of one or more ACL policies, users and authorizations associated with said users, and the like. In some embodiments, a permissions database may store one or more user signatures 132.

Processor 104 may generate and/or interact with one or more application programming interfaces (APIs). For instance an API generated by processor 104 may abstract hardware security module (HSM) and/or virtual hardware security module (vHSM) based signing modules, which may provide a uniform interface to signing keys regardless of a signing algorithm and/or key storage details. An API generated by apparatus 100 may be exposed, such as through JSON-RPC API. Certain fields of an API generated by apparatus 100 may have implementation-specific encodings, such as, but not limited to, 'KeyId' which may refer to a string encoding a key identifier, 'DecryptionKeyId' which may refer to a key identifier for a decryption key, 'Api Version' which may refer to a version of the API, 'KeyVersion' which may refer to a version of a key, 'Cryptosystem' which may refer to a type of cryptography, such as "bls: bls12381/g1", 'Purpose' which may refer to one or more actions, such as eth-staking, 'PubKey' which refer to an implementation-defined serialization of a public key, 'CreationTime' which may refer to a time of creation, such as "2023-01-25T19:33:23.416000-05:00", 'Tags' which may refer to a JSON object comprising an arbitrary set of key-value pairs, 'Enabled' which may refer to a bool indicator indicating whether a key can be used, 'Message' which may refer to a byte sequence to be signed, 'Signature' which may refer to a bye sequence representing an implementation-defined serialization of a signature, 'SecretKey' which may refer to a byte sequence representing an implementation-defined serialization of an asymmetric secret key used for signing, and 'EncryptedSecretKey' which may refer to a byte sequence representing an implementation-defined serialization of an encrypted secret key. An API generated by processor 104 may include one or more verbs. Verbs may be used in instances in which an API call fails, which may allow for a descriptive return error. For insatace, verbs may include, but are not limited to, 'DescribeKey', 'DisableKey', 'EnableKey', 'GetPublicKey', 'Sign', 'CreateKey', 'DeleteKey', 'ListKeys', 'ImportKey', and 'ExportKey'. A 'ListKeys' verb may list all keys matching a signing abstraction and may optionally be restricted to a given purpose. An 'ImportKey' verb may import a secret key. An 'ExportKey' verb may export an ecrypted copy of a secret key. An API generated by Apparatus 100 may allow for a uniform interface for keys that are stored directly in an HSM and/or as an encrypted data structure backed by an HSM scaling key.

In some embodiments, processor 104 may provide for an unstaking functionality. For instance, user request 112 may include a request to unstake one or more tokens, keys, and the like. A new token may be generated by processor 104 and unstake transaction details may be saved, such as in memory 108. Unstake transaction details may include, but are not limited to, validatory keys, epoch, and the like. A new token generated in response to user request 112 to unstake may be a MAC of one or more transaction details. An approval request may be posted to every user specified in a key's MFA policy. A notification may be provide to a user, such as "user X wants to unstake validator 0xdeadbeef (<validator-index>) [approve] [reject]." A new token generated in response to an unstaking request may be used to unstake one or more tokens and/or keys from a chain and/or smart contract.

In some embodiments, processor 104 may provide for ratcheting of one or more tokens and/or keys. Ratcheting may include invalidating old tokens and/or keys as new tokens and/or keys are issued. For instance, processor 104 may separate session expirations from token expirations, which may make one or more tokens expire quickly. An old token may be invalidated by changing it for a new token with a later expiration time. In some embodiments, processor 104 may utilize an authentication token for authorization and a refresh token that may be used to retrieve a fresh token pair. In some embodiments, a renewal confirmation mechanism may be employed by processor 104. For instance, if a client requests a renewal, an old token may continued to work until a new token is used for a first time, at which the old token is invalidated. This renewal confirmation mechanism may ensure that a dropped network connection during renewal does not leave a client without a valid token. In some embodiments, processor 104 may utilize and/or generate a token state machine. A token state machine may be configured to issue an authentication token and/or a refresh token for a session. An authentication token may have a shorter lifetime than a refresh token. As a non-limiting example, an authentication token may have a lifetime of about 60 to about 180 seconds and a refresh token may have a lifetime of about 180 to about 300 seconds. At issuance, both an authentication token and a refresh token may be valid and may remain in a valid state until expiration, invalidation, and/or revocation, at which point they enter an expired state. While an authentication token is valid, it may be used to authenticate for a specific session. While a refresh token is valid, it may be used to request new tokens such as new authentication and/or refresh tokens for a session following an initial session. When issued as a result of a refresh, an authentication token and a refresh token may both be in a pre-valid state. All other tokens in a pre-valid state may become invalid upon a refresh, while tokens in a valid state may not change states as a result of the refresh. Tokens in a pre-valid state may be used for authentication or refreshing as if they were in a valid state. Upon authentication or refreshing, all tokens in a valid state may immediately transition to an invalid state and a token pair of an authentication token and a refresh token may immediately transition to a valid sate. In some embodiments, while an authentication token is in a valid or pre-valid state, the authentication token may be used to revoke a session. Upon revocation, all tokens in valid, pre-valid, or invalid states may immediately transition to a revoked states. If a token in an invalid or revoked state is used to authentication, revoke, or refresh, all tokens for a corresponding session may immediately transition to a revoked state and an alarm may be generated that may indicate possible token theft. In some embodiments, at most one pair of an authentication token and a refresh token may be in a valid or pre-valid state. In some embodiments if a refresh token is in a valid or pre-valid state, an authentication token may be an either a valid or expired state.

A ratcheting of one or more tokens may be implemented by storing a counter 'epoch' in a database by processor 104 for each session, along with a secret per-session media access control (MAC) key. To generate an authentication token, processor 104 may compute an authorization token function that incorporates a session key, session identification, and/or epoch of a MAC key. To authenticate, processor 104 may send an epoch and/or authorization token to a server. A server may check that an authorization token is a valid MAC for a specific session identification and/or epoch. To refresh tokens, a sever may increment an epoch counter and compute new tokens. In some embodiments, a client may need to know both a MAC on a current epoch and a preimage of a value stored in a database to generate an authentication and/or refresh token. For instance and without limitation, an authorization token may be a 32-byte random value. A server may store a hash of an epoch token and an authorization token in order to authenticate. In some embodiments, to detect old tokens, a server may check if an epoch token is a valid MAC for an outdate epoch. A server may ignore a value of an authentication token since every use of an old credential may include an epoch token for a prior epoch, whether or not an authentication token is correct. A server may surmise that at least part of a credential has leaked based on checking an epoch token.

With continued reference to FIG. 1, processor 104 may allow for a user-custody model that may allow one or more users within an organization to have exclusive access to one or more keys. For instance, one or more keys may belong to organizations within which the one or more keys may be freely assigned to different roles which may have one or more users freely added to them. Processor 104 may allow for custody of one or more keys within an organization. Custody refers to an exclusive ability to use a key. For instance, processor 104 may annotate each key with a custody field that may indicate what form of custody should be enforced on the key. Custody of a key may allow for only a specific user to sign or export a specific key within an organization. User custody keys may go in user custody roles, and only custody holders may be in user custody roles. In some embodiments, a custody model may be employed for an entire organization. For instance, instead of a custody field on each key a custody field may be stored in an organization. User custody keys may be excluded from a set of exportable keys at an organization level. In some embodiments, an end-user may have an ability to export one or more keys they hold custody over.

Processor 104 may allow for end user custody of one or more keys. End user keys may be a key that organization owners and/or administrators cannot access in any way. After generating an end user key, an end user may sign using their key, add or update policies associated with their key, and/or initiate a key export procedure. Processor 104 may tie end user keys to identities furnished by one or more identity providers. An end user may have an identity tied to a key. An identity provider may maintain an end user's account. An identity provider may authenticate an end user and may attest to a result of authentication using a cryptographically signed OpenID connect (OIDC) token. An end user's email provider, which may be the same as their identity provider, may enable a key export function. An organization owner may present an interface to an end user. Processor 104 may be configured to communicate with an identity provider, email provider, and/or organization owner to allow for end user key exporting. For instance and without limitation, end user export ciphertext may be encrypted to a key-wrapping key of an organization that may house an end user key. Ciphertext may include information from an OIDC token that a user may have presented during an account setup. In an export initiation procedure, a user may present an OIDC token and processor 104 may send a confirmation email to an address that may be contained in the token. During a retrieval procedure, a user may prove receipt of a confirmation email. Processor 104 may check that an OIDC token presented during an export initiation matches one used for key generation and may release key material to a user. In some embodiments, processor 104 may receive an export request of a key from an end user. In response to an export request from an end user, processor 104 may validate an OIDC token and may look up a corresponding user and key. Processor 104 may check that a public encryption key provided to processor 104 in a request to export a user key is valid. Processor 104 may generate a fresh MAC key using KMS encrypted to a key-wrapping key of an organization that may manage end user key. Processor 104 may create a signer token for an end user, which may be scoped to key retrieval. Using a fresh MAC key, processor 104 may compute a MAC over all the data and may place the computed MAC value in a 'mac' field of a response. Processor 104 may encrypt a response to a user's public key. Processor 104 may send an encrypted bundle to a user's email address and may return a success message indicating that a user should check their email. Upon receiving an email, a user may decrypt an encrypted bundle received in their email using a secret key corresponding to a public key as described above and may construct a key retrieval request. For browser based clients, ciphertext may be embedded in a URL which may allow a user to only click on a link in an email to complete the process. For mobile applications, a URI using a special scheme registered to the mobile application may be used. Once processor 104 receives a key retrieval request initiated by a user, processor 104 may validate a session and look up a corresponding user and/or key. Processor 104 may decrypt a MAC key using a key wrapping key of a managing organization. Processor 104 may use a MAC key to check a MAC on a request. If a timestamp is out of date, processor 104 may reject a request. If a timestamp is in date, processor 104 may retrieve export ciphertext corresponding to a key identification and may decrypt the export ciphertext using a key-wrapping key of a managing organization. Processor 104 may encrypt key material generated by a decryption of export ciphertext. Processor 104 may invalidate a signer session corresponding to a specific key which may ensure that a request to export the key cannot be repeated. Processor 104 may return encrypted key material to a requestor.

In some embodiments, processor 104 may utilize a fast identity online (FIDO) authenticator instead of a user's email to export a key to a user. For instance, a client may generate an ephemeral key-export key and may send an export request authenticated with a clients credentials to a server and/or processor 104. A server and/or processor 104 may authenticate a client's credentials and may abort a procedure upon failure of authenticating the client's credentials. A client may proceed through a multi-factor authentication (MFA) approval procedure and may receive a FIDO approval ticket. A client may re-send an export request with a FIDO approval ticket included. A server and/or processor 104 may encrypt a user's key material and may send ciphertext to the user. A client may decrypt ciphertext to recover a user's key material. Encryption and/or decryption used throughout an end user export may include single shot HPKE rfc9180 with DHKEM (P256, HMAC-SHA256) as a KEM, HKDF-SHA256 as a KDF, and/or AES-256-CGM as a AEAD.

Still referring to FIG. 1, in some embodiments processor 104 may implement and/or perform a multi-region anti-slashing functionality and/or policy. An anti-slashing policy refers to a policy that guarantees that every signature for a given key meets some compatibility condition with respect to the entire history of signatures made under that key. An anti-slashing policy implemented by processor 104 may require every message being signed to be checked for compatibility with a history of signatures generated for a given key and may require updating a key's signing history under strict consistency semantics before a signature can be released to a requestor. If a history update fails, a signature may not be released. Processor 104 may augment a key's signing history with a region affinity. A region affinity refers to a value that corresponds to a key's primary region which is a region listed most recently in a key's signing history. A key's primary region may be the only region that is allowed to update the key's history. Utilization of a region affinity in an anti-slashing policy may allow for only a primary region to issue signatures for a key. In some embodiments, processor 104 may augment an anti-slashing policy by modifying a compatibility requirement by asserting that the region applying the policy is equal to the key's primary region. Changing a key's primary region may require updating the key's signing history to include a new primary region. In some embodiments, a primary region may not be available, in which a key may become unavailable since no other region is allowed to update an a region affinity of the key. Processor 104 may implement a forcible takeover approach in situations where a primary region may not be available. A forcible takeover approach may include forcibly taking over region affinity form another region. Processor 104 may implement a leasing function in situations where a primary region becomes unavailable. A leasing function may include inserting a timestamp into a region affinity of a key's signing history beyond which the region affinity is no longer valid. A lease of a region affinity of a key may be renewed. Processor 104 may forcibly disable an old primary region of a region affinity of a key, in some embodiments. Processor 104 may implement a list of regions, each having region having their own affinity. For instance, if all regions agree on a list of region affinities, then upon being asked to assume affinity, a region may forcibly disable one or more previous regions with higher precedence and/or previous primary regions. In some embodiments, processor 104 may implement an anti-slashing ticket policy. In an anti-slashing ticket policy, multiple regions may always act as primary regions with additional restrictions to ensure each regions coordination. A region may safely issue signatures as long as the region is sure that at least half of the other regions already know the updated version of the key's signing history. As a non-limiting example, a client may send a request to three regions and may receive at least one ticket. The client may send the ticket from one region to a different region and receive a signature. If any one region fails, the other two regions continue operating without downtime.

In some embodiments, processor 104 may perform public key authentication. For instance, processor 104 may utilize a challenge-response based mechanism that may require two round trips and no client side state. For instance, in a challenge-response based mechanism, a client may send a request to an endpoint and may specific an organizational identifier, user identification, and/or authentication public key identification for which to retrieve a challenge. An endpoint may be rate limited to prevent denial of service (DOS) attacks. A server may reject a request if a corresponding user of record does not exist and/or if a field of a user authentication public key is not a certain type, such as, but not limited to, one of "ChallengeResponse" or "any". A server may create an authentication public key challenge record which may include a universally unique identifier, an organizational identification, user identification, authentication public key identification, a random challenge value, a collision-resistant hash of a record such as a "UserAuthPk" record, and/or any metadata that may be required by a public key's message format. A server may store a record as described previously. A server may send a record to a client. A client may construct a request it wishes to authentication with a public key authentication under a fresh challenge and may generate a signature over a record and request in a format that may be defined by a field of a public key, such as, but not limited to, a "msg_typ" field. A client may send its request to a server which may include an authentication public key challenge identification and signature, which may all be within an authorization header of the request. A server may verify that an authentication public key challenge identification corresponds to a valid challenge and may reconstruct a message that the client should have signed from the client's request and one or more records, such as, but not limited to, an "AuthPkChallenge" and/or "UserAuthPk" record. A server may delete one or more records and verify that a signature over a message is valid. If one or more flags are not set in one or more records, a server may reject a request. Flags may include, but are not limited to, an "allow_oidc_auth" flag.

Processor 104 may utilize a counter mechanism that may avoid synchronization issues by allowing each client to maintain a private counter session. A counter session may be a signer session that can be used only for public key authentication and may be augmented with a counter used for anti-replay. A counter session may be created through a client sending a request to a an endpoint. An endpoint refers to one or more physical devices that connect to and exchange information with a computer network. A request sent by the client may be authenticated either with a challenge-response public key authentication of a bearer token. An endpoint may be similar to one or more other endpoints, such as a "create_session" endpoint. A request sent by a client to an endpoint may specify an authentication public key identification and/or other session options such as scopes, lifetimes, and the like. A server receiving a request may rejected the request if the request fails authentication, if the authentication does not have a scope required by an endpoint, if one or more records do not exist for an authenticated user, if a record specifies an incompatible message format, if a client has requested creation of a counter session for a role, if a user is not in a specified role, if one or more fields are not set correctly such as if a "UserAuthPk" s "restrict_to_scopes" field is not set to "none" and a specified role is not listed in the field. A server may reject a request if one or more records have one or more fields not set correctly, such as if a "UserAuthPk" record's "supported_anti_replay_mechanisms" field is not one of "CounterSessoin" or "any". A server may reject a request if scopes specified by a client are not a subset of scopes allowed by one or more records of a user authentication public key. A server may create a fresh session of a type specified by a client, which may include authentication data and/or session options such as, but not limited to, lifetimes, scopes, and the like. A server may create a counter session data record that may include session information, associated organization identification, user identification, authentication public key identification, collision resistant has of a record, and/or a 64-bit counter initialized to 0. A server may store one or more records described prior. A server may send a counter session data record to a client. A client may store a counter session data record for later user.

A client in possession of a valid counter session may authenticate a request. For instance, a client may increment a counter value included within a counter session data record. A client may construct a request it wishes to authenticate under a counter session and may generate a signature over a counter session data record and a request. A client may generate a signature in a format defined by a public key's message type field. A client may send a request to a server which may include a session token, current counter value, and/or a signature. A signature sent in a request by a client may be in an authorization header. A server may retrieve a counter session data record corresponding to a provided session token and may immediately reject a request if the session token does not exist. A server may check that a session token is valid and that a counter value provided by a client is greater than a value stored in a counter session data record and may reject a request if the counter value is less than or equal to a stored value in the counter session data record. A server may update a stored counter session data record to include a new counter value and may immediately reject a request if this update fails. A server may process a client's request and may treat the request as if it was authenticated under a session specified in a counter session data record.

With continued reference to FIG. 1, processor 104 may be configured to implement a key sharding functionality. A key shard refers to a portion of a whole key. Portions of a whole key may restored a whole key when combined. Processor 104 may generate one or more key shards and/or may receive one or more key shards. Processor 104 may split a key into one or more key shards and reconstruct the key in an enclave. If a user wishes to sign, the user may encrypt and send their shard to an enclave. An enclave may prove that its software will immediately delete a user's shard and reconstructed key after signing. A user may receive attestation before uploading a key shard and may encrypt the key shard to a key specified in an attestation document. Processor 104 may be configured to mitigate damage that may occur during a theft of one or more key shards. For instance, processor 104 may encrypt a key shard at rest under a key stored in a phone's secure element, such as, but not limited to, keychain on iOS. A user may be able to backup their shard using a phone's secure element. Processor 104 may encrypt a shard using a key that may be sealed to an enclave, such as but not limited to a key rotation enclave, which may allow a user to rotate a shard by re-encrypting the shard to a new key and deleting the old key.

Figure 2:
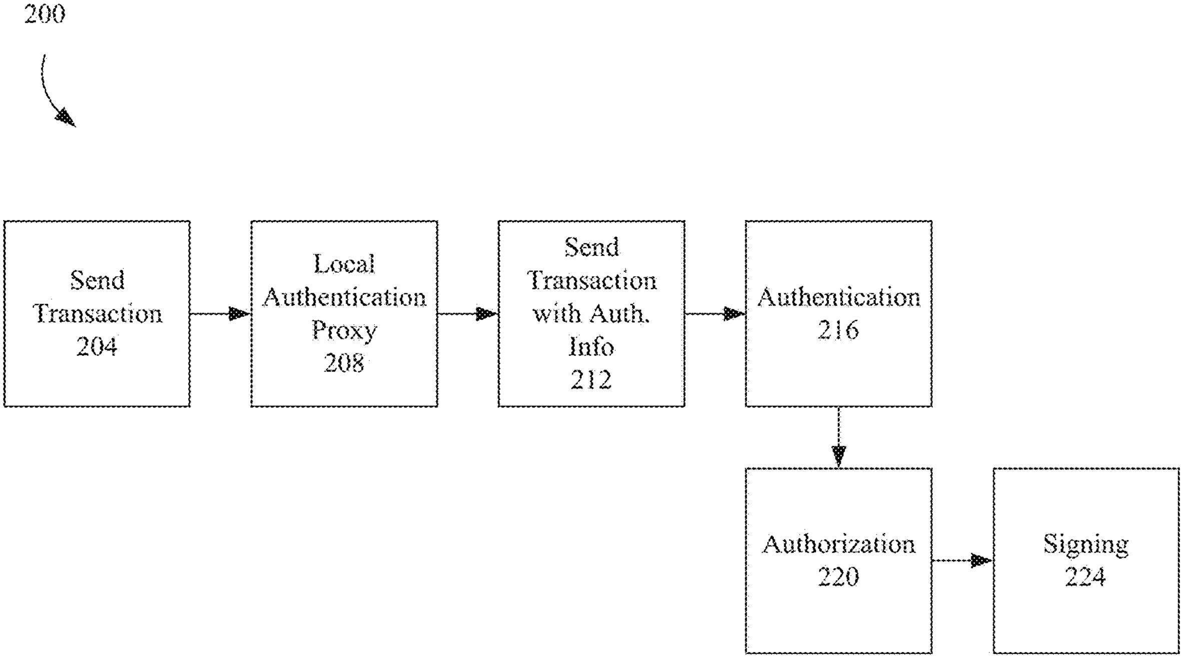
FIG. 2 illustrates a flow chart for managing credentials.

Referring now to FIG. 2, a flowchart of managing credentials is illustrated. At step 204, a transaction is sent. A transaction may include one or more requests, such as user request 112 as described above with reference to FIG. 1. A transaction may include data of two or more parties, such as, but not limited to, a sender and a receiver. A transaction may include a data type that may be transferred between two or more parties. A transaction may include a value associated with data that may be transferred between two or more parties. In some embodiments, a transaction may be sent between two or more computing devices through a local area network (LAN) and/or other network.

At step 208, the transaction is authenticated. Authentication may include utilizing a local proxy, modified web3.js, and the like, to authenticate data of the transaction sent at step 204. For instance, authentication may include comparing one or more usernames, passwords, dates, times, IP addresses, and the like.

At step 212, authentication data is added to the transaction. In some embodiments, authentication data may be added to the transaction after local authentication performed at step 208. Authentication data may include authentication data 120 as described above with reference to FIG. 1. Authentication data may be appended to one or more bytes of a transaction. In some embodiments, authentication data may include, without limitation, one or more tokens, keys, and/or other encrypted data.

At step 216, the transaction and authentication data is authenticated. Authentication may include providing one or more acceptable keys, passwords, and the like to a computing device. In some embodiments, authentication may be as described above with reference to FIG. 1, without limitation.

At step 220, authorization of the transaction is performed. Authorization may be performed by one or more computing devices, such as, but not limited to, laptops, smartphones, tablets, servers, and the like. Authorization may include comparing one or more bytes of authentication data, such as, without limitation, one or more tokens, usernames, passwords, private keys, and the like. Authorization may include checking a requested key of the transaction and/or an operation request of the transaction and comparing the request key and/or requested operation to the authentication data added to the transaction.

At step 224, the transaction is signed. Signing the transaction may include providing a digital signature, such as a digital signature described above with reference to FIG. 1. Signing the transaction may authorize one or more users to access data of one or more immutable sequential listings, databases, workspaces, and the like.

Still referring to FIG. 2, in some embodiments, a reference monitor may be employed. For instance, a reference monitor may sit in front of a signing device. A reference monitor may receiving incoming requests from an authenticated user and may ask to sign one or more messages with one or more keys. A reference monitor may perform one or more simple access control checks, such as, but not limited to, confirming that a current user can access a specific key. A reference monitor may look up a key-wrapping-key and an encrypted secret key corresponding to a specific key. A reference monitor may forward a signing request to a policy engine. A policy engine may run on a separate machine and may be considered untrusted. A policy engine may reply back with a single bit, either pass or fail. This request may be handled in parallel to other requests received by the reference monitor. In some embodiments, if a policy engine is compromised, it may indicated that a transaction may have been signed incorrectly. A reference monitor may forward a signing request and/or one or more keys to a signing machine. A signing machine may only be allowed to respond to requests from a reference monitor. A signing machine may talk to KMS and may serve as a proxy between a signing enclave and KMS. In some embodiments, a separate management enclave may handle key creation.

If a singing device is compromised, it may try to sign arbitrary messages with potentially arbitrary keys. A reference monitor may know which key was supposed to sign a request and with what message and may verify a signature and/or produce an alert if the verification failed. A reference monitor may provide a response to each request received without introducing a significant amount of latency.

Figure 3:
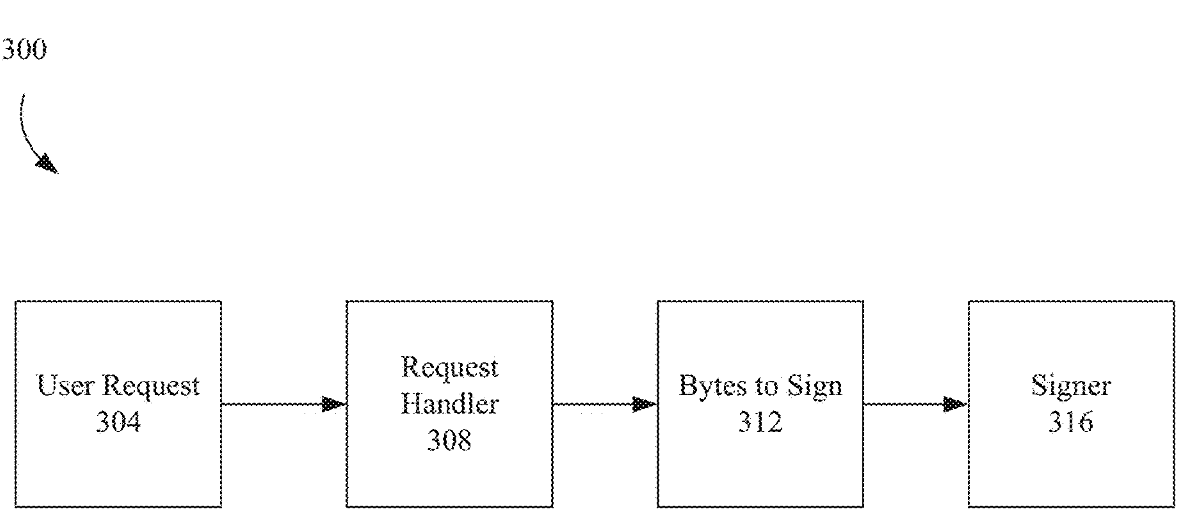
FIG. 3 illustrates a flow chart for managing credentials on a back-end.

Referring now to FIG. 3, a back-end operation of signing a transaction is presented. At step 304, a user request is sent to a computing device. A user request may include a request for data, access to one or more databases, and the like. A user request may include user request 112 as described above with reference to FIG. 1.

At step 308, a request handler handles the user request. A "request handler" as used in this disclosure is a function that determines whether an outgoing request should be mocked. A mocked response refers to a copy or imitated response used for client applications. In some embodiments, a request handler may specify a mocked response for one or more client applications. A request handler may include a rest, graphhql, and/or other type of request handler. A request handler may match one or more requests based on a handle type. Handle types may include, but are not limited to, "ethHandle", "avaHandl" e, "solHandler", "polyHandle", and the like.

At step 312, bytes of the transaction to be signed are determined. For instance, a byte string of "010110101" may be identified of a transaction. In some embodiments, one or more bytes to be signed may be determined by a type of request. For instance and without limitation, one or more bytes of a staking deposit request may computed and/or be determined to be signed, while for normal validations requests, bytes representative of a message root may be determined to be signed. In some embodiments, once one or more bytes are identified, the one or more bytes may be sent to a signer.

At step 316, a signer signs the transaction. In some embodiments, the signer may sign multiple transactions as a cluster. Signing the transactions may include providing one or more digital signatures to one or more transactions. In some embodiments, the signer may sign the transaction for a specific operation. For instance, and without limitation, the signer may sign the transaction using a Secrets Management Software, Multi-Party Computation Service Provider, HSM tools, and/or local files operations. A non-limiting example of a Secrets Management Software may include HashiCorp. A non-limiting example of a Multi-Party Computation Service Provider may include Fireblocks. In some embodiments, the signer may determine signatures for specific environments through data in one or more signing requests and/or endpoints of requests. Data may include originating and/or authentication data which may be used by the signer to determine which keys to use and sign the transaction with. In some embodiments, the signer may utilize one or more back-end modules, such as a hardware security module, to produce a signature. The signer may interact with one or more operations through a back-end of the signer, which may allow the signer to produce different signatures based on different signature requests from different environments. Signing a transaction for a specific operation may include providing one or more credentials for the specific operation. For instance, and without limitation, credentials may include passwords, private keys, and the like. In some embodiments, the signer may sign a first transaction for a first operation and a second transaction for a second operation. As a non-limiting example, a first transaction of a cluster may be signed for a Fireblocks operation and a second transaction of a cluster may be signed by an HSM-backed key. Signing the transactions may allow one or more users to access immutable sequential data of one or more operations. Operations may include, without limitation, transmitting funds between two or more parties, deploying smart contracts, integrating data with smart contracts, and the like. Operations may include, without limitation, managing data, storing data, modifying data, continuous integration (CI), continuous deployment (CD), and the like.

Figure 4:
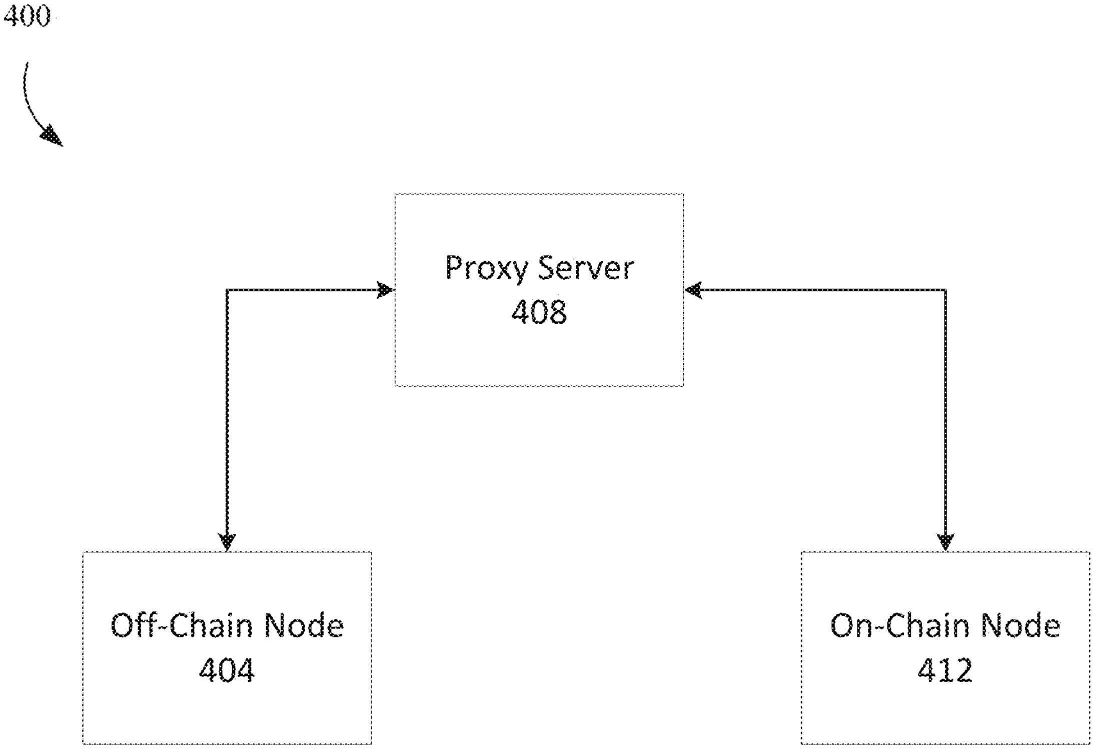
FIG. 4 illustrates an embodiment of a proxy server.

Referring now to FIG. 4, a block diagram of a proxy system 400 for an immutable sequential listing is presented. Proxy system 400 may include off-chain node 404. An off-chain node as used in this disclosure is a computing device that is not part of a block chain. Off-chain node 404 may include, without limitation, desktops, laptops, smartphones, tablets, servers, and the like. System 400 may include on-chain node 412. An on-chain node as used in this disclosure is a computing device that is part of a block chain. On-chain node 412 may include a laptop, smartphone, tablet, server, desktop, and/or other computing device. In some embodiments, system 400 includes proxy server 408. Proxy server 408 may include a server and/or other computing device that may be configured to interact with off-chain node 404 and on-chain node 412.

Proxy server 408 may be configured to intercept one or more communications between off-chain node 404 and on-chain node 412. For instance, proxy server 408 may be configured to intercept one or more API calls from off-chain node 404. An API provided by on-chain node 412 may require private keys and/or other credentials for authentication. Proxy server 408 may be configured to provide one or more private keys and/or other credentials to an API call from off-chain node 404 to on-chain node 412. As a non-limiting example, proxy server 408 may receive a block-chain transaction request from off-chain node 404. Proxy server 408 may provide one or more credentials for the block chain transaction request and communicate the request to on-chain node 412. On chain-node 412 may receive the credentials and provide transactional data to proxy server 408. Proxy server 408 may communicate the transactional data back to off-chain node 404. In some embodiments, proxy server 408 may allow off-chain node 404 and on-chain node 412 to interact without off-chain node 404 needing required credentials for accessing information from on-chain node 412. Credentials and/or private keys may be isolated from a client and/or one off-chain node 404 and/or on-chain node 412. Proxy server 408 may be self-hostable, which may allow developers to maintain control over keys. In some embodiments, proxy server 408 may be a hosted service.

In some embodiments, proxy server 408 may have one or more configurations. For instance proxy server 408 may have an endpoint configuration of a set of credentials available. In some embodiments, proxy server 408 may have an endpoint configuration of a location of a client that provides a chain API. Proxy server 408 may be updated to modify a set of credentials available and/or a location of a client that provides a chain API for various environments. Proxy server 408 may be configured to implement a least privilege protocol for one or more off-chain nodes 404. A least privilege protocol as used in this disclosure is a system that gives one or more users accounts credentials only essential to an intended function. Credentials may include, but are not limited to, one or more keys, usernames, passwords, and the like. In some embodiments, access to proxy server 408 may be limited through one or more access lists. For instance, a user may be permitted or denied access to proxy server 408 based on one or more factors such as authentication of the user, security level of the user, and the like. In some embodiments, proxy server 408 may cease communications with on-chain node 412 if an unauthorized user is attempting access to on-chain node 412. In some embodiments, proxy server 408 may be configured to log data of off-chain node 404 and/or on-chain node 412. For instance, proxy server 408 may record and/or store dates, times, IP addresses, usernames, passwords, and/or other data of off-chain node 404. In some embodiments, proxy server 408 may record data from on-chain node 412 that may have been transferred or otherwise accessed by off-chain node 404. Proxy server 408 may further generate metrics of recorded data and may communicate the metrics to one or more computing devices. Metrics may include, without limitation, type of data accessed, number of users, dates of access, times of access, and the like. In some embodiments, proxy server 408 may be configured to detect one or more anomalies of data recorded, such as unusual time of day, unusual quantity of data accessed, high frequency interaction with a particular user, and the like.

Figure 5:
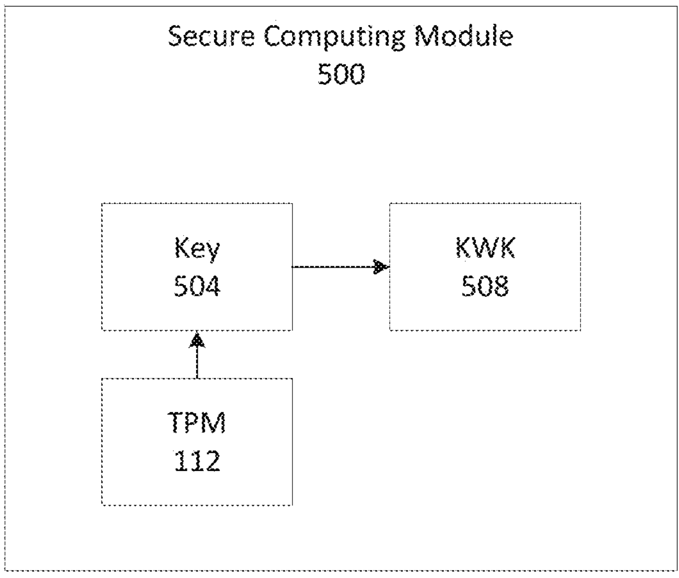
FIG. 5 illustrates a secure computing module.

Referring now to FIG. 5, a secure computing module 500 is presented. Secure computing module 500 may include any computing device as described throughout this disclosure, without limitation. In some embodiments, secure computing module 500 may include a tamper-resistant virtual machine. For instance, secure computing module 500 may include trusted platform module (TPM) 112. In an embodiment, TPM 112 may include a hardware module, which may be an integrated circuit, an optoelectronic circuit, a section of an integrated circuit on the same die as a processor, an integrated circuit packaged with other die in a multi-chip module or other multi-die integration method, or printed circuit board product. TPM 112 may have any suitable elements of digital or analog circuitry usable to perform one or more processes as described herein, including without limitation processes used to determine confidence levels and/or authenticate digitally signed assertions as described below. TPM 112 may have memory and/or other logic and/or a processor in its own right which may be in a non-limiting example a crypto-processor. TPM 112 may have a hard-coded process for signing a digital signature, which may be performed as described above using a secret, such as a private key, which is associated with a verification datum, such as a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. A private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 5, TPM 112 may include circuitry to generate one or more asymmetric key pairs according to a public key cryptosystem as described above, and/or to sign a digital circuit. TPM 112 may include one or more tamper-proofing designs or components to prevent reverse-engineering, for instance, and without limitation. TPM 112 may include metastable elements, such that it is not possible to predict the circuit behavior from a plan of the circuit, without electrically probing the circuit. One or more instances or subsections of the circuit may be disposed within a three-dimensional chip in a form that makes it infeasible to probe with drilling and/or thinning via chemical-mechanical polishing, grinding, etching or the like, or slicing the chip, and so arrayed that drilling and/or slicing and/or thinning via chemical-mechanical polishing, grinding, etching or the like will destroy the circuit sufficiently to make the private key impossible to recover. Random and/or physically unclonable functions may be used by a cryptoprocessor in the TPM 112 to ensure that the manufacturer furthermore has no way of predicting how subsequent key-pairs can be generated.

Secure computing module 500 may be a secure enclave. A secure enclave as used in this disclosure is a computing environment that provides isolation for code and data from an operation system. In some embodiments, secure computing module 500 may include a virtual hardware security module (vHSM). For instance, securing computing module 500 may include an enclave in combination with a HSM, such as TPM 112, which together may make a virtual HSM. Secure computing module 500 may be configured to cryptographically attest one or more data elements. Cryptographic attestation may include providing a cryptographic checksum of a software that may be operating inside a secure enclave and signing the checksum with a key that may be securely stored in a hardware module of secure computing module 500. Cryptographic attestation may allow a computing device to prove its authenticity and/or integrity. In some embodiments, secure computing module 500 may be configured to seal one or more elements of data to one or more trusted HSMs. For instance, secure computing module 500 may seal a cryptographic key to a HSM that may be only accessible by an enclave whose attestation matches some specified value. As a non-limiting example, an enclave, such as secure computing module 500, may ask an HSM to generate a key sealed to the enclave's own attestation data which may ensure that only an enclave running exactly the same software can access the cryptographic key.

Secure computing module 500 may be configured to perform symmetric key wrapping to produce a key-wrapping key (KWK). A KWK may include a first cryptographic key that may be encrypted with a second cryptographic key. In some embodiments, a key may be key-wrapped inside a physical HSM which may seal the key to the enclave. In some embodiments, any secret key material generated by secure computing module 500 may be encrypted using the KWK and may be stored in a replicated database and/or other database.

In some embodiments, secure computing module 500 may generate one or more keys. Key generation may include requesting 128 random bytes from a HSM. In some embodiments, key generation may include more than or less than 128 random bytes from a HSM. Key generation may include using a randomized byte or bytes, such as, without limitation, the 128 random bytes described above, to generate a fresh signing key pair. Key generation may include generating a fresh symmetric encryption key inside an HSM and scaling the symmetric encryption key to an enclave's attestation data. In some embodiments, key generation may include invoking a HSM's encryption function and encrypting a secret key with a symmetric encryption key. In some embodiments, key generation may include storing ciphertext resulting from encrypting a secret key with a symmetric encryption key in a database. Key generation may include returning a unique key identifier and a public key, such as a public key of the fresh signing key pair as described above.

In some embodiments, secure computing module 500 may generate one or more signatures. Secure computing module 500 may retrieve an encrypted secret key and may invoke an HSM's decryption function. Secure computing module 500 may decrypt a key using an HSM's decryption function. Secure computing module 500 may generate a requested signature using a decrypted signing key and securely erase the decrypted signing key, returning only the signature.

In some embodiments, secure computing module 500 may import one or more keys. Importing a key may include generating an ephemeral asymmetric encryption key and signing a public key using an enclaves master signing key (MSK) by following a signature workflow. The public key and the signature may be sent to a holder of a key being imported. The key holder may verify the signature on the public key under the enclave's MSK. The key holder may encrypt the key being imported under a public key and may send the encrypted public key to the enclave, such as secure computing module 500. In some embodiments, secure computing module 500 may decrypt ciphertext which may yield a secret key to be imported. Secure computing module 500 may key-wrap the secret key as described above.

In some embodiments, secure computing module 500 may export one or more keys. Exporting a key may include retrieving an encrypted secret key to be exported. Exporting a key may include invoking a HSM's decryption function and decrypting the encrypted secret key. In some embodiments, secure computing module 500 may encrypt the secret decrypted above using a KWK, and/or other encryption keys, including keys split across multiple parties, and returning the resulting ciphertext.

In some embodiments, secure computing module 500 may be configured to provide standards-compatible interfaces for block chain transaction signatures, such as, but not limited to, ethers-rs, ethers-js, web3.js, and the like. One or more keys may be securely stored in secure computing module 500. In some embodiments, secure computing module 500 may be configured to provide one or more signatures for staking. For instance, by providing standards-compatible interfaces allowing stakers to use one or more keys securely stored inside secure computing module 500. In some embodiments, secure computing module 500 may be configured to generate a secure key backup. A user may send existing key material to secure computing module 500. Secure computing module 500 may import the existing key material and generate one or more key backups. In some embodiments, secure computing module 500 may be configured to provide a multiparty computation (MPC). For instance, secure computing module 500 may be configured to execute one or more protocols using an HSM to securely store MPC-related secrets. In some embodiments secure computing module 500 may be configured to use enclave attestation to give confidence levels to one or more parties observing an MPC execution that the correct software was used during the MPC.

In some embodiments, secure computing module 500 may be configured to generate a digital wallet for one or more individuals. Secure computing module 500 may generate a user's keying material and expose a service allowing a key's owner to use a stored key. In some embodiments, if the user decides to take custody of the key, the user may execute a key export, such as the key export as described above, which may generate a copy of the key in a secure computing module 500 to become a secure backup. In some embodiments, secure computing module 500 may act as a secure fallback wallet. For instance, secure computing module 500 may impose a cooling-off delay before generating a signature. During the cooling-off delay a user may be notified about a request and may cancel the request for key generation. In some embodiments, secure computing module 500 may be configured to perform split key custody and export. For instance, a key may only be accessed upon receipt of one or more signatures from several previously authorized keys that are selected at a setup and that cannot be changed afterwards. In some embodiments, secure computing module 500 may be configured to act as a signing protocol adapter. Secure computing module 500 may generate and use standards-compliant keys. Access to secure computing module 500 may be granted based on some user-specified authentication scheme. Secure computing module 500 may act as a proxy that may adapt a user-specified authentication scheme into a signature scheme that may be compatible with existing blockchains.

Still referring to FIG. 5, in some embodiments, secure computing module 500 may interface with one or more APIs. In some embodiments, secure computing module 500 may act as an API. For instance, secure computing module 500 may act as a signer abstraction. A signer abstraction is an abstract interface that may be exposed through one or more APIs, such as, without limitation a JSON-RPC API. Secure computing module 500 may generate an API that abstracts HSM and vHSM based signing modules which may provide a uniform interface to signing keys regardless of a signing algorithm and/or key storage details. In some embodiments, certain fields of an API of secure computing module 500 may have certain implementation-specific encodings. For instance, a “KeyId” field may include a string encoding a key identifier. In some embodiments a “KeyId” field may simply be a key identifier provided by an underlying KMS. A field of an API of secure computing module 500 may include a “DecryptionKeyId” field, which may be a key identifier for a decryption key. A field of an API may include a “KeyDescription” field which may be a JSON object comprising fields of “ApiVersion”, “KeyVersion”, “Cryptosystem”, “Purpose”, “PupKey”, “CreationTime”, “Tags”, “Enabled”, and the like. A field of an API may include a “Message” field, which may be a byte sequence to be signed by a signer. An API may include a “Signature” field, which may include a byte sequence representing an implementation-defined serialization of a signature. A field of an API may include a “SecretKey” field, which may include a byte sequence representing an implementation-defined serialization of an encrypted secret key. In some embodiments, an API of secure computing module 500 may be programmed to run one or more commands/verbs. For instance, an API may include a “DescribeKey” verb, which may pull up a KeyId and/or KeyDescription field as described above. An API may include a “DisableKey”, “EnableKey”, “GetPublicKet”, “Sign”, “CreateKey”, “Detelkey”, “ListKeys”, “ImportKey”, “ExportKey”, and/or other verbs/commands.

Referring still to FIG. 5, secure computing module 500 may perform one or more functions. For instance, secure computing module 500 may provide standards-compatible interfaces which may allow blockchain clients, such as, but not limited to, ethers-rs, ethers-js, web3.js, or other blockchain clients, to use one or more keys securely stored in secure computing module 500. One or more access control polices of secure computing module 500 may include, but are not limited to, authorization such as two-factor codes, hardware identity tokens, and/or other access control policies. In some embodiments, secure computing module 500 may provide standards-compatible interfaces that may allow one or more stakers to use one or more keys securely stored inside secure computing module 500. Secure computing module 500 may allow for a secure key backup function, as described above. For instance, secure computing module 500 may receive existing key material from a user, such as, but not limited to, mnemonics, which may be used to generate transaction or staking keys. A user may send existing key material to secure computing module 500 through a key import functionality, as described above. One or more keys may be retrieved through a key-export function, as described above. In some embodiments, secure computing module 500 may MPC client as a service functionality. For instance, secure computing module 500 may implement MPC functionality and execute one or more protocols using an HSM to securely store MPC-related secrets. Secure computing module 500 may utilize enclave attestation to give confidence to one or more parties observing the MPC execution that the correct software was used during MPC. Secure computing module 500 may perform a consumer wallet as a service functionality. For instance, secure computing module 500 may generate one or more user's keying material in a vHSM. Secure computing module 500 may expose a service allowing a key owner to use one or more stored keys. If a user decides they want to take custody of one or more keys, the user may execute a key-export function as described above. A copying of one or more keys may become secure backups stored in secure computing module 500. In some embodiments, secure computing module 500 may provide for a secure fallback wallet functionality. For instance, a key may be intended for infrequent and/or emergency use. Secure computing module 500 may impose a cooling-off delay before generating a signature. During a cooling-off delay, a user may be notified about the request and may cancel the request. Secure computing module 500 may perform a split key custody functionality. For instance, a key may be accessed upon receipt of one or more signatures from one or more previously authorized keys. One or more signatures of one or more previously authorized keys may be selected at a setup of secure computing module 500 and/or a split key custody functionality. In some embodiments, selection of one or more previously authorized keys may be irreversible, similar to a blockchain based multi-signature wallet. A split key custody functionality of secure computing module 500 may provide for a multi-signature wallet without requiring interaction with one or more chains of a blockchain.

In some embodiments, secure computing module 500 may provide for a signing protocol adapter functionality. For instance, a vHSM may generate and use one or more standards-compliant keys. Access to generate signatures in a vHSM of secure computing module 500 may be based on a user-specific authentication scheme. As a non-limiting example, a vHSM may generate secp256k1 signatures for use with Etherum, but may require a valid Ed22519 signature on ‘msg’ in order to generate a secp256k1 signature on ‘msg’. In this example, the vHSM adapts the user-specific authentication scheme into a signature scheme that may be compatible with existing blockchains. A signing protocol adapter functionality of secure computing module 500 may allow one or more companies to use tokens to generate blockchains signatures indirectly, for instance if the company requires a use of a hardware token that does not support blockchain signatures. Secure computing module 500 may allow for a non-fungible token (NFT) and/or digital asset storage as a service functionality. For instance, secure computing module 500 may expose a server for managing and/or using NFTs and/or other digital assets. In some embodiments, secure computing module 500 may perform an operating account functionality. For instance, secure computing module 500 may generate one or more wallets that may be used frequently but may also have limited funds associated with them. One or more wallets may be paired with one or more other wallets that have more funds but are used less frequently. Secure computing module 500 may impose additionally security checks one or more paired wallets, such as, but not limited to, two factor and/or multi-party computation (MPC) policies that may limit transferring of funds to operating wallets. Secure computing module 500 may allow for custom policy pipeline functionality, which may allow for the building of applications that have first-class audit and/or accounting support. As a non-limiting example, an internal accounting team may be able to audit and manage spending. A custom policy pipeline functionality of secure computing module 500 may allow for built-in fraud prevention. For instance, an anomaly detection policy may be used to determine general spending usage trends and deny unsafe transactions, require approval of anomalous transactions, and/or other functions. Custom policy pipeline functionality of secure computing module 500 may allow for compliancy with OFAC by restricting which accounts can serve as destinations of transactions. For instance, a custom policy pipeline functionality of secure computing module 500 may allow different users and/or teams to interface with contrast in a least-privileged way. As a non-limiting example, operations teams may have access to a subset of a contract's behavior, modify fields such as "this contract is live", and the like. A security team may have an ability pause a contract. Both the security and operations teams may both have to sign off on upgrading the contract. In some embodiments, one or more policies may be implemented in front of a vHSM and/or implemented on-chain which may in effect extending the vHSM guarantees from the cloud to the chain.

Still referring to FIG. 5, in some embodiments a vHSM of secure computing module 500 may allow for key management service (KMS)-backed vHSM by sealing one or more keys to an enclave that may provide all required cryptographic functionality. Enclaves may include, but are not limited to, Intel SGX, ARM TrustZone, AMD SEV-SNP, AWS Nitro Enclaves, GCP Shielded VMs, Azure Attestation, and/or other enclaves from cloud providers. Software inside a vHSM and on a machine hosting the vHSM may be written in "[safe Rust] [saferust]". A rust compiler may rule out large classes of bugs and may give a programmer control over timing, location of data in memory, or other parameters. A secure enclave image may include only required cryptographic functionality, such as, but not limited to, key generation, signature generation, key import, and/or key export. Each security domain of a vHSM may utilize a symmetric key-wrapping key generated and/or stored in side a physical HSM, such as through, but not limited to, Amazon KMS. Keys sealed to an enclave of vHSM may only be accessible to the enclave's software. All secret key material generated by an enclave may be encrypted using a security domain's key-wrapping key and resulting ciphertext may be stored in a geo-replicated database. A geo-replicated database may include, but is not limited to, DynamoDB. All secret keys used by an enclave of a vHSM when generating signatures may only be present in decrypted form while actually in use. All secrets may be securely erased from memory after use.

A vHSM of secure computing module 500 may have a key wrapping key function that may be limited to one key-wrapping key per security domain and may be bound to an HSM. A VHSM of secure computing module 500 may include a data key that may be limited to one per signing secret key and may be generated by an HSM. A vHSM of secure computing module 500 may include a signing secret key that may be generated and/or imported by an enclave and may be processed by the enclave. An enclave of a vHSM of secure computing module 500 may request a data key from an HSM, which may result in a fresh key and an encryption of the fresh key to a security domains key-wrapping key. An enclave may utilize a value from a request as a symmetric key and may encrypt key material using a secure AEAD cipher. An enclave may securely erase unencrypted key material and may return ciphertext generated and/or received. A vHSM of secure computing module 500 may have a key unwrapping function. For instance, inside an enclave of secure computing module 500, the enclave may request decryption of a data key by using an HSM using a security domain's key-wrapping key and may use the result as a symmetric key to decrypt an encrypted secret key.

An enclave of secure computing module 500 may perform a key generation function. For instance, an enclave may initialize a random number generator (RNG) using one or more randomness sources. An enclave may use an RNG to generate fresh keying material. Keying material may be in a form of a BIP-39 mnemonic, which may ensure that a key's owner is able to import keying material into a ledger or similar device after executing a key export function. An enclave may execute a key export function using keying material and security domain identification. An enclave may derive a signing secret key using keying material. An enclave may execute a key wrapping subroutine using a current security domain identification and a signing secret key. An enclave may store ciphertext resulting from execution of a key wrapping subroutine in a geo-replicated database for later retrieval. An enclave may return a unique key identifier and a newly generated public key.

An enclave of secure computing module 500 may perform a signature generation. For instance, an enclave may execute a key unwrapping subroutine using a current security identification and a wrapped secret key, which may be aborted upon failure. An enclave may generate a requested signature using a decrypted signing key. An enclave may securely erase a decrypted key and return a generated signature. An enclave of secure computing module 500 may perform a key import function. A key holder, which may be outside of an enclave, may request an ephemeral asymmetric encryption key from the enclave. An enclave may generate an ephemeral asymmetric encryption key and produce and attestation document demonstrating that this key was generate inside the enclave. A key holder may verify an attestation document for an ephemeral asymmetric encryption key, which if verification vails, may be aborted. A key holder may encrypt key material to be imported using an ephemeral asymmetric encryption key and may send resulting ciphertext to an enclave. An enclave may decrypt ciphertext using a generated secret key and may yield key material to be imported. From here, an enclave may perform one or more steps of the key generation function described above.

In some embodiments, a key import function of secure computing module 500 may support Legacy-RSA and/or Elliptic Curve Diffie-Hellman (ECDH) protocols. For instance, a user may retrieve a long-lived RSA key that may be KMS-bound and sealed to an enclave. A user may use an RSA key as an asymmetric key in a hybrid encryption scheme, such as, but not limited to, RSA-OAEP-Sha256 for asymmetric encryption and XChaCha20-Poly1305 for symmetric encryption. Resulting ciphertext may be sent to an enclave, which may use KMS to decrypt and import keying material. For ECDH imports, a user may retrieve an ephemeral key-import key and a corresponding attestation document from an enclave. User may verify an attestation and ephemeral key from an enclave. A user may encrypt keying material using an ephemeral key-import key and may send ciphertext to an enclave. An enclave may decrypt and import a key. An ECDH import may use NIST P-384, HPKE, and/or AES-256-CGM, without limitation. Generating an ephemeral key-import key ma y include sampling a fresh NIST P-384 key pair by an enclave. A randomness of a NIST P-284 key pair may be derived from one or more cryptographically strong and independent sources, such as, but not limited to, AWS KMS, enclave OS, and the like. A P-384 secret key may be wrapped by an enclave using the enclave's key-wrapping key. A key-wrapping process may include metadata attached to ciphertext as auxiliary authenticated data. Metadata may include, but is not limited to, a string identifying a cryptosystem associated with a key, an identifier of a KMS key-wrapping key used for encryption, an expiration date for an ephemeral key, and/or other data. An expiration date for an ephemeral key may be a maximum of 15 minutes into the future. An enclave may sign both a public key and ciphertext using the enclave's attested signing key. In some embodiments, a domain-separation tag, public key, and/or ciphertext may be signed. Each field of a domain-separation tag, public key, and/or ciphertext may be hashed with a collision-resistant hash. Input to a hash function may be injectively encoded. Injectively encode refers to encoding in a way that every valid encoding corresponds to a unique triple. A signing hash value may be signed with an enclave's current attested signing key. For instance and without limitation, a signing hash value may be signed with the RSA-PSS-SHA-256 algorithm. An enclave may send a public key, ciphertexts and expirations date, signatures, and/or the enclave's attestation document to a user. Attestation and/or ephemeral key-import keys may be verified. For instance, a user may verify an enclave's attestation document and use the enclave's attested signing key to check a signature on a public key and wrapped secret key provided by the enclave, which if verification fails, the user aborts. A user may also verify that attestation is no more than 15 minutes old and/or that an ephemeral key-import key has not passed it's expiration date. A user may allow up to 5 minutes of grace time for clock skew, in some embodiments. Keying material may be encrypted to an ephemeral key-import key. A user may encrypt their keying material using an ephemeral key-import key. For instance, a user may sample a random NIST P-384 Diffic-Hellman key, without limitation. Using a secret key, a user may compute a shared secret with an enclave's ephemeral key. A user may employ the RFC9180 HPKE rfc9180 algorithm and/or a slated version of HPKE using the DHKEM NIST-p384 AES-256-CGM cipher suite. A user may encrypt keying material under a key along with a nonce derived using AES-256-CGM. Authenticated data may not be used in encryption since it may have been included in key derivation. A user may send a public key, data output, wrapped secret key, and/or expiration date to an enclave or other destination. Keying material may be decrypted by an enclave. For instance, an enclave may check an expiration date, which if the expiration date has passed, the enclave may abort operation. An enclave may allow for up to 5 minutes of grace time for clock skew. An enclave may unwrap a wrapped secret key using KMS with a user's organizations key-wrapping key identification, a cryptosystem identification, and/or supplied expiration date as an authenticated date. An enclave may derive an HPKE shared secret corresponding to an HPKE shared secret that may have been unwrapped from a wrapped secret key. An enclave may decrypt a user's key material using any suitable algorithm such as the AES-256-CGM algorithm and/or with a nonce value, which, if decryption fails, the enclave may abort. An enclave may import resulting key material from decryption of a user's key material.

In some embodiments, an enclave of secure computing module 500 may have a key export function. For instance, an enclave may verify a signature on a supplied key-export configuration against a current security domain identification and a hard coded KXSK, which, if verification fails, may be aborted. If a key export configuration indicates user facing export, an enclave may encrypt keying material to the enclave-sealed key owned by a key recover enclave indicated in a configuration of a key export function and may return resulting ciphertext. If a configuration of a key export function indicates a custodial export procedure, the configuration may include a list of public keys and a threshold number of recipients required to decrypt. An enclave may threshold encrypt a secret to one or more recipients and return resulting ciphertext and encrypted shares.

A key export function of an enclave of secure computing module 500 may be user facing and/or organization facing. For instance, an organization facing export may allow an organization's administrators and other parties to construct a key export configuration. A key export configuration may include a set of encryption keys and a threshold required to decrypt them. When any key is imported or generated, a valid key export configuration may accompany a request and a key export ciphertext may be generated. An organization's administrators may decrypt ciphertext with a sufficient number of keys. An export procedure may utilize NIST P-384 and/or XChaCha20-Poly1305. P-384 keys may be generated using YubiKey, in some embodiments. A key-export configuration may be constructed by one or more organization's administrators and/or other parties. Organization administrators may device on a number of hardware-bound encryption keys to register and a minimum number of those keys required to decrypt an exported key. For each encryption key being registered, an organizational administrator may use a fresh YubiKey to generate a NIST P-384 key in [PIV][ykpiv] slot 9D in addition to a certificate attesting to the key's creation on the YubiKey. An organizational administrator may send an x509 path that may include two certificates, such as a device's attestation certification and an attestation for a generated key for each encryption key. Secure computing module 500 may bundle certificates and/or an organization's administrator's chosen threshold into a key-export configuration. Secure computing module 500 may sign a key-export configuration with a unique identifier of an organization's key-wrapping key under either a canonical key-export signing key or a chain of signatures rooted at the canonical key. Secure computing module 500 may send a signed bundle to an organization's administrator. Secure computing module 500 may install a signed bundle in an organization's configuration. An enclave may generate a key-export ciphertext. Generation of a key-export ciphertext may be executed each time an enclave's key-import or key generation function is invoked. If no key-export configuration was supplied, secure computing module 500 may not perform any key-export ciphertext generation and may return a null value. Secure computing module 500 may check a signature on a key-export configuration against a configuration's content and an identifier of a key may be used to wrap newly imported or generated keys. If verification fails, secure computing module 500 may abort an operation. Secure computing module 500 may sample a fresh XChaCha20-Poly1305 key and may use it to encrypt keying material being imported or generated. Secure computing module 500 may generate a threshold secret sharing of a key, one share for each of the encryption keys in a key-export configuration and using a configured threshold. Secure computing module 500 may encrypt each share to a corresponding key from a key-export configuration. Secure computing module 500 may bundle encrypted shares, ephemeral keys, encrypted key material, and the like, into key export ciphertext. Secure computing module 500 may send key-export ciphertext to an organizational administrator.

Decryption of a key-export ciphertext may occur on an organizational administrator's side. An organizational administrator may have access to a number of keys, such as but not limited to YubiKeys. A number of keys may correspond to a threshold as described above. An organizational administrator may parse key-export ciphertext to obtain encrypted shares corresponding to ephemeral keys and encrypted keying material. For each encrypted share and corresponding ephemeral key for which a YubiKey is available, that YubiKey may be used to compute a shared secret by completing a non-interactive DH exchange and then decrypting the encrypted share. Once at least a threshold of shares has been decrypted, a shared secret may be reconstructed, which may be an XChaCha20-Poly1305 key. A share secret key may be used to decrypt encrypted keying material. In some embodiments, a leader may be chosen from a plurality of key holders that may participate in decryption. All other participating key holders may be followers who may confirm that a leader's public key is one of the key's included in the signed key-export configuration. Each follower may parse key-export ciphertext to obtain encrypted shares corresponding to ephemeral DH keys and encrypted keying material. A follower may decrypt their share and may re-encrypt their hare to a leader's key. New ciphertext may be sent to a leader from a follower. Once a leader has received at least a threshold of re-encrypted shares from followers, the leader may decrypt those shares and reconstruct a shared secret which may be a XChaCha20-Poly1305 key. A leader may decrypt encrypted keying material. A leader and followers may communicate over authenticated communication channels during the above.

Figure 6:
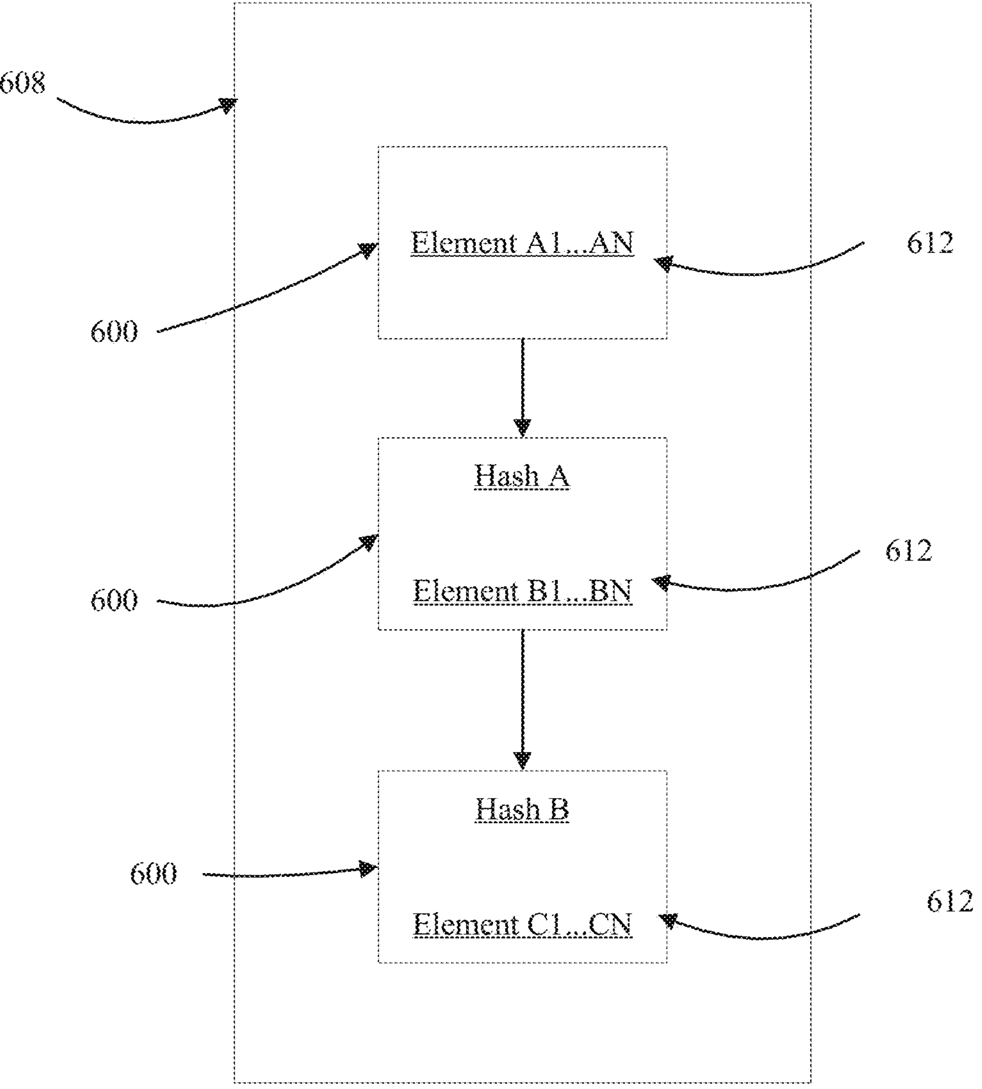
FIG. 6 illustrates an exemplary embodiment of an immutable sequential listing.

With reference now to FIG. 6, an immutable sequential listing 600 is shown. As used in this disclosure, immutable sequential listing 600 may be, include and/or implement an immutable ledger, where data entries that have been posted to immutable sequential listing 600 cannot be altered. In some embodiments, immutable sequential listing 600 may be utilized in a smart contract. A "smart contract" as used in this disclosure is a self-executing contract with the terms of agreement between a buyer and a seller being directly written into lines of code. Immutable sequential listing 600 may be utilized in a smart contract to unalterably store transactional data such as, but not limited to, identification of parties, transferred assets, values of assets, dates, times, ownership information, and the like.

Referring still to FIG. 6, immutable sequential listing may include data elements 602. Data elements 604 may include any form of data, including textual data, image data, encrypted data, cryptographically hashed data, and the like. A collection of textual data of data elements 604 may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or ciphertext data. In an embodiment, a collection of textual data may be encrypted and/or may be a hash of other data. For instance, a collection of textual data may include a root or node of a Merkle tree or hash tree, or a hash of any other information desired to be recorded in some fashion using a digitally signed assertion. Data elements 604 may include, without limitation, one or more digitally signed assertions. Digitally signed assertions may include a collection of textual and/or other data that is signed using a secure proof. A digitally signed assertion 604 may be signed by a digital signature created using the private key associated with the owner's public key. In some embodiments, a collection of textual data may state that the owner of a certain transferable item represented in a digitally signed assertion register is transferring that item to the owner of an address.

Still referring to FIG. 6, a digitally signed assertion may describe a transfer of virtual currency, such as cryptocurrency. Virtual currency may be a digital currency. In some embodiments, data elements 604 may include an item of value. An item of value may be a transfer of trust, for instance represented by a statement vouching for the identity or trustworthiness of the first entity, without limitation. An item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security. A digitally signed assertion of data elements 604 may describe a transfer of a physical good and/or a digital good. For instance, a digitally signed assertion may describe a sale of a product or other physical asset. In some embodiments, a transfer nominally of one item may be used to represent a transfer of another item. For instance, a transfer of virtual currency may be interpreted as representing a transfer of an access right. In some embodiments, where an item nominally transferred is something other than virtual currency, the transfer itself may still be treated as a transfer of virtual currency, having value that depends on a variety of potential factors including the value of the item nominally transferred and the monetary value attendant to having the output of the transfer moved into a particular user's control. An item of value may be associated with a digitally signed assertion by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, immutable sequential listing 600 and/or data elements 604 may include an address. An address may include a textual datum identifying the recipient of virtual currency or another item of value in a digitally signed assertion. In some embodiments, an address may be linked to a public key, the corresponding private key of which is owned by the recipient of a digitally signed assertion. For instance, an address may be the public key. An address may be a representation, such as a hash, of the public key. An address may be linked to the public key in memory of a computing device, for instance via a "wallet shortener" protocol. In some embodiments, where an address is linked to a public key, a transferee in a digitally signed assertion may record a subsequent digitally signed assertion transferring some or all of the value transferred in the first a digitally signed assertion to a new address in the same manner. A digitally signed assertion may contain textual information that is not a transfer of some item of value in addition to, or as an alternative to, such a transfer. For instance, as described in further detail below, a digitally signed assertion may indicate a confidence level associated with a distributed storage node as described in further detail below.

In an embodiment, and still referring to FIG. 6 immutable sequential listing 600 may record a series of posted content in a way that preserves the order in which the posted content took place. Immutable sequential listing 600 may be accessible at any of various security settings. For instance, and without limitation, immutable sequential listing 600 may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such a database may incorporate protective measures to ensure that malicious actors may not query the database repeatedly in an effort to narrow the members of a set to reveal uniquely identifying information of a given posted content.

Still referring to FIG. 6, immutable sequential listing 600 may preserve the order in which at least a posted content took place by listing them in chronological order. Alternatively or additionally, immutable sequential listing 600 may organize data elements 604 into sub-listings 602 such as "blocks" in a blockchain, which may be themselves collected in a temporally sequential order. Data elements 604 within a sub-listing 602 may be temporally sequential. A ledger of immutable sequential listing 600 may preserve an order in which data of data elements 604 took place by listing them in sub-listings 602 and placing the sub-listings 602 in chronological order. Immutable sequential listing 600 may be a distributed, consensus-based ledger. In some embodiments, the ledger may be a secured ledger. In one embodiment, a secured ledger may include a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 602 or "block." An example of a block chain is the BITCOIN block chain used to record BITCOIN transactions and values. Sub-listings 602 may be created in a way that places the sub-listings 602 in chronological order and link each sub-listing 602 to a previous sub-listing 602 in the chronological order so that any computing device may traverse the sub-listings 602 in reverse chronological order to verify any at least a posted content listed in the block chain. Each new sub-listing 602 may be required to contain a cryptographic hash describing the previous sub-listing 602, such as hash 606. In some embodiments, the block chain contains a single first sub-listing 602 sometimes known as a "genesis block."

Still referring to FIG. 6, the creation of a new sub-listing 602 may be computationally expensive; for instance, the creation of a new sub-listing 602 may be designed by a "proof of work" protocol accepted by all participants in forming the immutable sequential listing 600 to take a powerful set of computing devices a certain period of time to produce. Where one sub-listing 602 takes less time for a given set of computing devices to produce the sub-listing 602 protocol may adjust the algorithm to produce the next sub-listing 602 so that it will require more steps; where one sub-listing 602 takes more time for a given set of computing devices to produce the sub-listing 602 protocol may adjust the algorithm to produce the next sub-listing 602 so that it will require fewer steps. As an example, protocol may require a new sub-listing 602 to contain a cryptographic hash describing its contents; the cryptographic hash may be required to satisfy a mathematical condition, achieved by having the sub-listing 602 contain a number, called a nonce, whose value is determined after the fact by the discovery of the hash that satisfies the mathematical condition. Continuing the example, the protocol may be able to adjust the mathematical condition so that the discovery of the hash describing a sub-listing 602 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 602 according to the protocol is known as "mining." The creation of a new sub-listing 602 may be designed by a "proof of stake" protocol as will be apparent to those skilled in the art upon reviewing the entirety of this disclosure.

With continued reference to FIG. 6, where two entities simultaneously create new sub-listings 602, immutable sequential listing 600 may develop a fork. A protocol may determine which of the two alternate branches in the fork is the valid new portion of the immutable sequential listing 600 by evaluating, after a certain amount of time has passed, which branch is longer. "Length" may be measured according to the number of sub-listings 602 in the branch. Length may be measured according to the total computational cost of producing the branch. Protocol may treat only at least a posted content contained in the valid branch as valid. When a branch is found invalid according to this protocol, at least a posted content registered in that branch may be recreated in a new sub-listing 602 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

With continued reference to FIG. 6, in some embodiments, virtual currency, such as crypto-currency, may utilize one or more immutable sequential listings 600. Crypto-currency may include Bitcoins, Peercoins, Namecoins, and/or Litecoins. Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 602 in a block chain computationally challenging; the incentive for producing sub-listings 602 may include the grant of new crypto-currency to the miners. Quantities of crypto-currency may be exchanged as described above.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus. In general, the computer-readable programs can be implemented in any programming language. The software programs can be further translated into machine language or virtual machine instructions and stored in a program file in that form. The program file can then be stored on or in one or more of the articles of manufacture.

Figure 7:
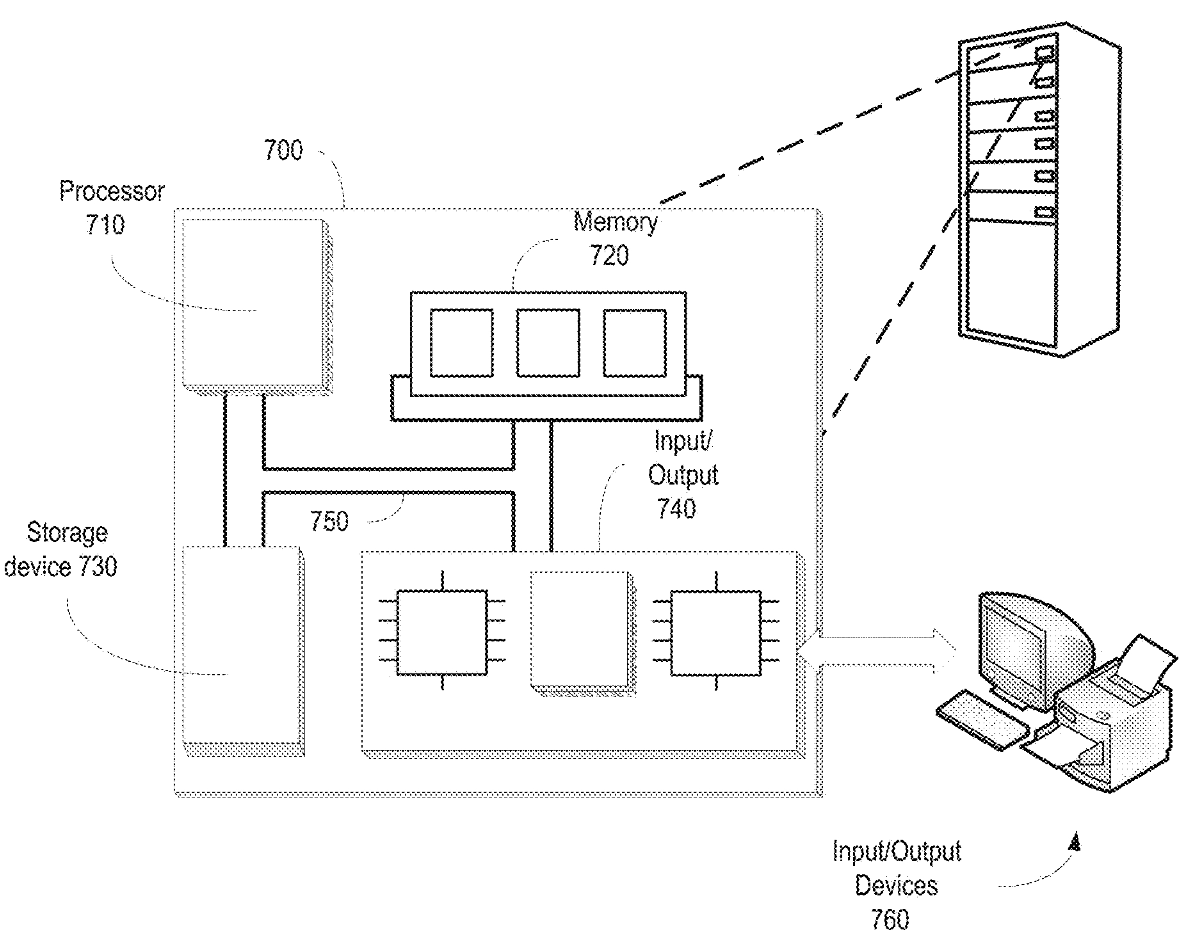
FIG. 7 illustrates a computing system that can be used to implement any one or more of the methodologies disclosed herein and any one or more portions thereof.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. In some implementations, the processor 710 is a programmable (or reprogrammable) general purpose microprocessor or microcontroller. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, for example as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

As used in this disclosure, communicatively connected means connected by way of a connection, an attachment, or a linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Referring back to FIG. 1, apparatus 100 and/or processor 104 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device (not shown). Network interface device may be utilized for apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a shared nothing architecture in which data is cached at the worker, in an embodiment, this may enable scalability of apparatus 100 and/or another computing device.

With continued reference to FIG. 1, apparatus 100, and/or any other computing device as described throughout this disclosure, may be designed and/or configured to perform any method, method step, or sequence of method steps in any embodiment described in this disclosure, in any order and with any degree of repetition. For instance, the processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, apparatuses, methods, and systems described herein may perform and/or implement one or more aspects of a cryptographic system. In one embodiment, a cryptographic system is a system that converts data from a first form, known as plaintext, which is intelligible when viewed in its intended format, into a second form, known as ciphertext, which is not intelligible when viewed in the same way. Cyphertext may be unintelligible in any format unless first converted back to plaintext. In one embodiment, a process of converting plaintext into cyphertext is known as encryption. Encryption process may involve the use of a datum, known as an encryption key, to alter plaintext. Cryptographic system may also convert cyphertext back into plaintext, which is a process known as decryption. Decryption process may involve the use of a datum, known as a decryption key, to return the cyphertext to its original plaintext form. In embodiments of cryptographic systems that are symmetric, decryption key is essentially the same as encryption key: possession of either key makes it possible to deduce the other key quickly without further secret knowledge. Encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are asymmetric, either encryption or decryption key cannot be readily deduced without additional secret knowledge, even given the possession of a corresponding decryption or encryption key, respectively; a common example is a public key cryptographic system, in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

A digital signature as used herein includes a secure proof of a secret data element as applied to a set of data; secure proof may be applied to a mathematical representation of a set of data such as, without limitation, a cryptographic hash, also known as a hash, of the set of data. A cryptographic hash, as used in this disclosure, is a mathematical representation of a lot of data, such as files or blocks in a block chain as described in further detail below; the mathematical representation is produced by a lossy one-way algorithm known as a hashing algorithm. Hashing algorithm may be a repeatable process; that is, identical lots of data may produce identical hashes each time they are subjected to a particular hashing algorithm. Because a hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

As a non-limiting example, a digital signature may include an encrypted mathematical representation of a file or other set of data using the private key of a public key cryptographic system. A digital signature may be verified by decrypting the encrypted mathematical representation using the corresponding public key and comparing the decrypted representation to a purported match that was not encrypted. In some embodiments, if the signature protocol is well-designed and implemented correctly, this means the ability to create the digital signature is equivalent to possession of the private decryption key. Likewise, if a mathematical representation of a file is well-designed and implemented correctly, any alteration of the file will result in a mismatch with the digital signature. In some embodiments, the mathematical representation may be produced using an alteration-sensitive, reliably reproducible algorithm, such as a hashing algorithm as described in further detail below. A mathematical representation to which the signature may be compared may be included with signature, for verification purposes. In other embodiments, the algorithm used to produce the mathematical representation is publicly available, permitting the easy reproduction of the mathematical representation corresponding to any file.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. A digital signature may be incorporated in a digital certificate, which is a document authenticating the entity possessing the private key by authority of the issuing certificate authority and signed with a digital signature created with that private key and a mathematical representation of the remainder of the certificate. In other embodiments, a digital signature is verified by comparing the digital signature to one known to have been created by the entity that purportedly signed the digital signature. For instance, if the public key that decrypts the known signature also decrypts the digital signature, the digital signature may be considered verified. A digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. threshold cryptography). A confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated. In other embodiments, certificate authority confidence levels may be aggregated according to any method shown herein. Aggregate confidence level may be used for threshold cryptography as described above. For instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. As a non-limiting example, a certificate authority may include any distributed certificate authority as described in this disclosure and/or any disclosure incorporated herein by reference. A certificate authority may, as a non-limiting example, post one or more credentials and/or authorization tokens to a temporally sequential listing as described in further detail below, indicating authentication and/or authorization of a device such as a requesting device as described below in further detail.

In an embodiment, a certificate authority may include a manufacturer of a device. For instance, a manufacturer may verify that a private key, or secret usable to produce a secure proof as set forth in further detail below, available to a device is associated with one or more devices produced by the manufacturer. Verification may take the form of a digital signature created by the manufacturer, signing a verification datum and/or public key corresponding to the private key and/or secret belonging to the device. Private keys and/or secret keys may be device-specific or may be issued to a group of devices; in the latter case, a device signing with a private key and/or generating a secure proof based on secret may convey that it belongs to that group of devices, without making it possible for a device evaluating the signature and/or secure proof to identify the specific device. A group of devices so identified may have characteristics in common, such as instances and/or versions of hardware, firmware, or other elements, including without limitation secure computing modules as described in further detail below; identification that device is in group may, for instance, indicate that device may be trusted to a certain degree, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where a group has been compromised, given a lower confidence level, or the like, individual devices in group having device-specific secrets or private keys may sign transactions with such keys, sacrificing a degree of anonymity to differentiate themselves from compromised members of such groups. Group keys and/or secrets may be embedded in hardware of devices during manufacture, as described in further detail below. Group keys and/or secrets may be assigned and/or signed by devices other than manufacturers; group keys and/or assignment of group keys may be used in direct anonymous attestation as described in further detail below. Group keys may enable processes of identification and/or attestation, such as without limitation direct anonymous attestation, to be performed in which a digital signature and/or secure proof confirms that an entity and/or device is part of a group, but cannot determine which member of a group it is.

In some embodiments, persons, devices, or transactions may be authenticated or assigned a confidence level using digital certificates. In one embodiment, a digital certificate is a file that conveys information and links the conveyed information to a certificate authority that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, an apparatus for managing credentials is provided. The apparatus may include a processor and a memory communicatively connected to the processor. The memory may contain instructions configuring the processor to receive a user request. The processor may be configured to authenticate the user request through an authentication module. The processor may be configured to combine authentication data with the user request to generate an authentication request. The processor may be configured to communicate the authentication request to an authorization module. The processor may be configured to authorize the user request at the authentication module based on the authentication data. The processor may be configured to sign the user request to generate a user signature. The authentication module may include a local authentication proxy. A user signature may provide a user with access to an immutable sequential listing. In some embodiments, a user signature may be generated for a type of immutable sequential listing. The processor may be configured to generate a proxy server. A proxy server may be configured to communicate a user signature between an off-chain node and ad on-chain node. In some embodiments, the processor may be configured to key-wrap a user signature with a symmetric key-wrapping key inside a physical hardware security module (HSM). The processor may be configured to cryptographically seal the user signature to the HSM. In some embodiments, the apparatus includes a trusted platform module (TPM) in communication with the processor. The TPM may be configured to store a user signature. The processor may be configured to provide a user signature through an application programming interface (API). The processor may be configured to receive a user request and identify, at a request handler, bytes to be signed based on a handle of the user request. The processor may sign the bytes to be signed based on the handle of the user request. In some embodiments, the processor may be configured to generate an access control list and modify access to a user signature based on the access control list and other configurable policies.

In some embodiments, a method for managing credentials using a computing device is presented. The method may include receiving a user request and authenticating the user request through an authentication module. In some embodiments, the authentication module may include a local authentication proxy. The method may include combining authentication data with the user request to generate an authentication request. The method may include communicating the authentication request to an authorization module and authorizing the user request at the authorization module based on the authentication data. The method may include signing the user request to generate a user signature. The user signature may provide a user with access to an immutable sequential listing. Generating the user signature may include signing the user request for a type of immutable sequential listing. The method may include generating a proxy server and communicating the user signature between an off-chain node and an on-chain node through the proxy server. The method may include key-wrapping the user signature with a symmetric key-wrapping key inside a physical hardware security module (HSM). In some embodiments, the method may include cryptographically sealing the user signature to the HSM. The method may include storing the user signature in a trusted platform module (TPM). The method may include providing the user signature to a computing device through an application programming interface (API). In some embodiments, the method includes receiving the user request and identifying, at a request handler, bytes to be signed based on a handle of the user request. The method may include signing the bytes to be signed based on the handle of the user request. In some embodiments, the method includes generating an access control list and modifying access to the user signature based on the access control list.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention. Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for managing credentials, comprising:

a processor; and a memory communicatively connected to the processor, the memory containing instructions configuring the processor to:

receive a user request;

authenticate the user request through an authentication module;

combine authentication data with the user request to generate an authentication request;

communicate the authentication request to an authorization module;

authorize the user request at the authorization module based on the authentication data;

sign the user request to generate a user signature; and provide a user device access to an immutable sequential listing based on the user signature.

2. The apparatus of claim 1, wherein the user signature is generated for a type of immutable sequential listing.

3. The apparatus of claim 1, wherein the processor is further configured to generate a proxy server, wherein the proxy server is configured to communicate the user signature between an off-chain node and an on-chain node.

4. The apparatus of claim 1, wherein the processor is further configured to key-wrap the user signature with a symmetric key-wrapping key inside a physical hardware security module (HSM).

5. The apparatus of claim 4, wherein the processor is further configured to cryptographically seal the user signature to the HSM.

6. The apparatus of claim 1, further comprising a trusted platform module (TPM) in communication with the processor, wherein the TPM is configured to store the user signature.

7. The apparatus of claim 1, wherein the processor is further configured to provide the user signature through an application programming interface (API).

8. The apparatus of claim 1, wherein the processor is further configured to:

receive the user request;

identify, at a request handler, bytes to be signed based on a handle of the user request; and sign the bytes to be signed based on the handle of the user request.

9. The apparatus of claim 1, wherein the processor is further configured to:

generate an access control list; and modify access to the user signature based on the access control list.

10. The apparatus of claim 1, wherein the authentication module includes a local authentication proxy.

11. A method for managing credentials using a computing device, comprising:

receiving a user request;

authenticating the user request through an authentication module;

combining authentication data with the user request to generate an authentication request;

communicating the authentication request to an authorization module;

authorizing the user request at the authorization module based on the authentication data;

signing the user request to generate a user signature; and providing a user device access to an immutable sequential listing based on the user signature.

12. The method of claim 11, wherein signing the user request to generate the user signature comprises signing the user request to generate the user signature for a type of immutable sequential listing.

13. The method of claim 11, further comprising:

generating a proxy server; and communicating the user signature between an off-chain node and an on-chain node through the proxy server.

14. The method of claim 11, further comprising key-wrapping the user signature with a symmetric key-wrapping key inside a physical hardware security module (HSM).

15. The method of claim 14, further comprising cryptographically sealing the user signature to the HSM.

16. The method of claim 11, further comprising storing the user signature in a trusted platform module (TPM).

17. The method of claim 11, further comprising providing the user signature to a computing device through an application programming interface (API).

18. The method of claim 11, further comprising:

receiving the user request;

identifying, at a request handler, bytes to be signed based on a handle of the user request; and signing the bytes to be signed based on the handle of the user request.

19. The method of claim 11, further comprising:

generating an access control list; and modifying access to the user signature based on the access control list.

20. The method of claim 11, wherein the authentication module includes a local authentication proxy.

* * * * *